United States Patent [19]

Kushida et al.

[11] Patent Number: 4,501,781
[45] Date of Patent: Feb. 26, 1985

[54] BOTTLE-SHAPED CONTAINER

[75] Inventors: Hideo Kushida, Yachiyo; Sumio Takahashi, Sakura; Shuichi Koshio, Koto, all of Japan

[73] Assignee: Yoshino Kogyosho Co., Ltd., Tokyo, Japan

[21] Appl. No.: 463,838

[22] Filed: Feb. 4, 1983

[30] Foreign Application Priority Data

Apr. 22, 1982 [JP]  Japan .................................. 57/67780

[51] Int. Cl.$^3$ ............................................. B65D 23/00
[52] U.S. Cl. ...................................... 428/35; 215/1 C; 428/475.2; 428/480; 525/425
[58] Field of Search ......................... 525/425; 215/1 C; 428/35, 475.2, 480

[56] References Cited

U.S. PATENT DOCUMENTS

| | | | |
|---|---|---|---|
| 3,686,069 | 8/1972 | Winkler ................................ | 525/425 |
| 4,066,587 | 1/1978 | Mains et al. ......................... | 525/425 |
| 4,145,372 | 3/1979 | Murray et al. ....................... | 525/425 |
| 4,217,435 | 8/1980 | McConnell et al. ................. | 525/425 |
| 4,398,642 | 8/1983 | Okudaira et al. ................... | 215/1 C |

*Primary Examiner*—John E. Kittle
*Attorney, Agent, or Firm*—Parkhurst & Oliff

[57] ABSTRACT

A hollow blow-molded bottle-shaped container of biaxially oriented resin mixture material comprising a polyethylene terephthalate resin and a xylylene group-containing polyamide resin, wherein the resin mixture material contains 5 to 30% of the xylylene group-containing polyamide resin to the polyethylene terephthalate resin. In this container, inner and outer surface layers of the container are formed of the polyethylene terephthalate resin, and the intermediate layer of the container is formed of the mixture resin material. In this manner, the gas barrier properties of the container can be enhanced.

14 Claims, 3 Drawing Figures

BOTTLE-SHAPED CONTAINER

BACKGROUND OF THE INVENTION

This invention relates to a hollow blow-molded bottle-shaped container of biaxially oriented polyethylene terephthalate resin.

Polyethylene terephthalate resin, hereinafter referred to as "PET", has a variety of excellent properties and characteristics. In order to take advantage of the excellent properties and characteristics of PET, a bottle-shaped container made of PET is usually biaxially oriented.

Although the conventional hollow blow-molded bottle-shaped container of biaxially oriented PET has a variety of advantageous properties and characteristics as described above, the container does not always exhibit a sufficiently strong gas barrier property.

In order to supplement the insufficient gas barrier property of the bottle-shaped container of PET, it has been considered heretofore to provide a hollow blow-molded bottle-shaped container of biaxially oriented PET with a multilayer structure including, in combination, a layer formed of a synthetic resin material having excellent gas barrier properties and a layer formed of PET. However, the adhering strength between the layer formed of the material having excellent gas barrier properties and the layer formed of PET is weak or insufficient because of differences in cooling shrinkage factors, at the molding time, between the layer formed of the material having excellent gas barrier properties and the layer formed of PET and of insufficient compatibility, bonding strength and reaction strength between the material having excellent gas barrier properties and PET. Thus, the mechanical strength of such bottle-shaped containers is insufficient and gas, such as carbon dioxide, may escape from the contents of the container and accumulate between the layer formed of the material having excellent gas barrier properties and the intermediate layer formed of PET.

In other words, when a performed injection molded piece is covered with a surface layer in which both inner and outer surfaces of an intermediate layer formed of a material having high gas barrier properties are covered with PET, the surface layer and the intermediae layer are bonded relatively strongly in the preformed injection molded state. However, when the preformed piece is further blow-molded to biaxially orient the preformed piece into a bottle-shaped container, the bonding strength between the surface layer and the intermediate layer becomes extremely weak due to the differing degrees of orientation beweeen the surface layer and the intermediate layer of the bottle-shaped container.

Accordingly, the carbon dioxide gas that penetrates into the inner surface layer is readily accumulated between the inner surface layer and the intermediate layer as described above. In this manner, an exfoliation between the inner surface layer and the intermediate layer occurs over the entire bottle-shaped container, and the body of the container tends to swell, since the body of the container cannot withstand the internal pressure produced in the container by the outer surface layer and the intermediate layer due to the internal pressure of the container, resulting in a substantial deterioration of the external appearance of the bottle-shaped container as a merchandise item.

A further drawback of the resin material which has excellent gas barrier properties is that the material whitens when it contacts water. When a gap is formed between the inner surface layer and the intermediate layer of the bottle-shaped container as described above, the intermediate layer is whitened due to water which penetrates to a very small degree into the gap formed between the inner surface layer and the intermediate layer, thereby resulting in a decrease of transparency of the bottle-shaped container.

SUMMARY OF THE INVENTION

Accordingly, an object of the present invention is to provide a hollow blow-molded bottle-shaped container of biaxially oriented polyethylene terephthalate resin which can eliminate all the aforementioned drawbacks and disadvantages of the conventional bottle-shaped container and which can maintain extremely high bonding strength between a surface layer and an intermediate layer of the container while maintaining excellent gas barrier properties.

Another object of the present invention is to provide a hollow blow-molded bottle-shaped container of biaxially oriented polyethylene terephthalate resin which does not cause an exfoliation between the surface layer and the intermediate layer.

Yet another object of the present invention is to provide a hollow blow-molded bottle-shaped container of biaxially oriented polyethylene terephthalate resin which has extremely high mechanical strength.

Still another object of the present invention is to provide a hollow bottle-shaped container of biaxially oriented polyethylene terephthalate resin which can simply control the temperature at the blow-molding time.

Still another object of the invention is to provide a hollow bottle-shaped container of biaxially oriented polyethylene terephthalate resin which can maintain high transparency even with the surface layers and the intermediate layer.

BRIEF DESCRIPTION OF THE DRAWINGS

The above and other related objects and features of the invention will become apparent from the following description of the disclosure, the accompanying drawings and the novelty thereof pointed out in the appended claims.

DESCRIPTION OF THE PREFERRED EMBODIMENTS

Figure 1:
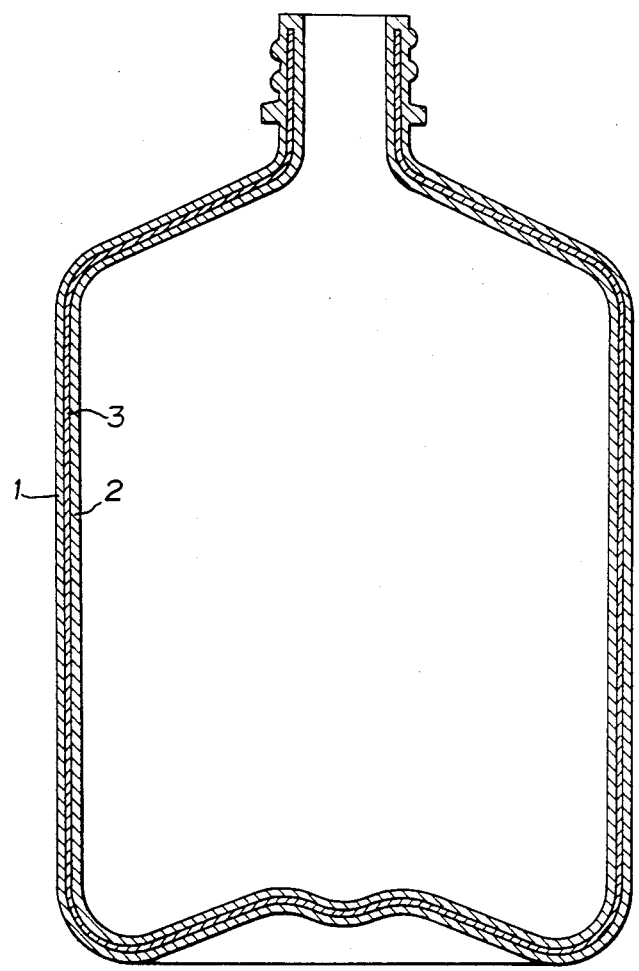
FIG. 1 is an elevational side view of a preferred embodiment of the hollow bottle-shaped container of biaxially oriented PET according to the present invention.

The present invention will now be described in more detail with reference to the accompanying drawings.

A hollow blow-molded bottle-shaped container of a biaxially oriented resin mixture material without a multilayer structure having excellent gas barrier properties will be described as a preferred embodiment of the present invention.

The bottle-shaped container is blow-molded by biaxial orientation with a resin mixture material which includes PET and a xylylene group-containing polyamide resin. The resin mixture material contains 5 to 30% by weight of the xylylene group-containing polyamide resin to PET.

The gas barrier properties of the bottle-shaped container thus prepared are controlled by the xylylene group-containing polyamide resin present at a ratio of 5 to 30% by weight to PET. The higher the mixture ratio of the xylylene group-containing polyamide resin to PET is in this range, the higher the gas barrier properties of the bottle-shaped container become.

This xylylene group-containing polyamide resin is one of the synthetic resin materials having the highest gas barrier properties, it also has excellent resistance against the contents contained in the bottle-shaped container and other physical properties similar to PET at the molding temperature.

If the mixture ratio of the xylylene group-containing polyamide resin is, however, excessively high, such as larger than 30% by weight to PET, the wall structure of the bottle-shaped container will become a laminated foil structure, thereby causing a trend of an exfoliation between the foil layers of the bottle-shaped container. Thus, the mechanical strength such as the wear resistance and the internal pressure resistance against the contents contained in the container are abruptly deteriorated, and the moldability of the bottle-shaped container is largely aggravated.

Therefore, when a bottle-shaped container is blow-molded that will contain a liquid that is hermetically contained in the bottle-shaped container but does not require the bottle-shaped container to have high gas barrier properties it is preferred to mold the bottle-shaped container with a resin mixture material having approximately 5 to 10% by weight of the xylylene group-containing polyamide resin to PET. On the other hand, when a bottle-shaped container is blow-molded that will contain a liquid that requires the bottle-shaped container to have high gas barrier properties it is preferred to mold the bottle-shaped container with a resin mixture material having as close to 30% by weight of the xylylene group-containing polyamide resin to PET as possible without deteriorating the mechanical strength of the wall of the bottle-shaped container to be blow-molded.

An example of the measured values relative to the gas barrier properties of the bottle-shaped container will be listed below.

When a bottle-shaped container havingg a body wall thickness of 0.45 mm is molded with only 37 g of PET, the amount of oxygen that penetrated through the bottle-shaped container was 0.0180 cc per day. When a bottle-shaped container molded with a resin mixture material which included 20% by weight of xylylene group-containing polyamide resin to PET, the amount of oxygen that penetrated through the bottle-shaped container was 0.0001 cc per day. It was clear that the bottle-shaped container molded with the resin mixture material including the xylylene group-containing polyamide resin exhibited very high gas barrier properties.

The amount of carbon dioxide gas that penetrated through the bottle-shaped containers were measured under the pressurized state for the bottle-shaped containers made with only PET and with PET and the resin mixture material as above. The amount of carbon dioxide gas contained in the bottle-shaped container was decreased by 23.3% when in the bottle-shaped container was molded with only PET and was allowed to stand for 60 days at 4° C. On the other hand, the amount of carbon dioxide gas contained in the bottle-shaped container was decreased by only 14.8% when the bottle-shaped container was molded with the resin mixture material which contained 20% by weight of xylylene group-containing polyamide resin to PET and was allowed to stand for 60 days at 4° C.

From the above experiments, it is clear that the bottle-shaped container molded with the above resin mixture material provides high gas barrier properties even to carbon dioxide gas contained in the bottle-shaped container.

With respect to the reasons that the bottle-shaped container of the invention exhibits high gas barrier properties as described above, a variety of factors can be considered as follows: When the mixture ratio of the xylylene group-containing polyamide resin to PET is excessively increased, it is considered that the wall structure of the molded bottle-shaped container is progressively converted into a laminated foil structure so that an exfoliation between the laminated foils tends to occur, the xylylene group-containing polyamide resin mixed with PET acts to arrange the molecular array of PET in multilayer foils and to strengthen the bonding between the molecules of PET forming the respective layers, thereby forming the wall structure of the bottle-shaped container in a multilayer structure, with the result that the high gas barrier properties are realized.

As described above, the xylylene group-containing polyamide resin arranges the molecules of PET in a laminar state and strengthens the bonding between the molecules of PET, but also weakens the bonding strength between the molecules forming the respective layers and hence the molecules between the layer. Accordingly, when the mixture ratio of the xylylene group-containing polyamide resin is excessively large, an exfoliation between the layers of the bottle-shaped container tends to occur, thereby deteriorating the mechanical strength of the bottle-shaped container, and since the respective layers of the bottle-shaped container are molded along the orienting direction during blow-molding the moldability of the bottle-shaped container is aggravated.

A bottle-shaped container molded with a resin mixture material which is mixed with the xylylene group-containing polyamide resin in PET having a multilayer structure according to another embodiment of the present invention will now be described.

As shown in FIG. 1 the bottle-shaped container with this multilayer structure layer is formed with inner and outer surface layers 1 and 2, and with an intermediate layer 3 in a multilayer wall structure. The surface layers 1 and 2 are formed of PET, and the intermediate layer 3 is formed of a resin mixture material of PET and a xylylene group-containing polyamide resin.

The mixture ratio of the xylylene group-containing polyamide resin to PET forming the above intermediate layer 3 is in the range of 5 to 50% by weight of the xylylene group-containing polyamide resin to PET, with a preferred range of 10 to 30% and a most preferred amount of 20%. In this bottle-shaped container with a multilayer wall structure, the mixture ratio of the xylylene group-containing polyamide resin can be higher as compared to a single layer bottle-shaped container formed of the above synthetic resin since the inner and outer surface layers of the bottle-shaped container are covered with PET.

According to experiments, it was found that the amount of oxygen gas that penetrated a bottle-shaped container molded with 20% by weight mixture of the xylylene group-containing polyamide resin could be reduced to 1/10 of that of a bottle-shaped container molded with only a single layer of PET. It was also found that the amount of carbon dioxide gas that penetrated a bottle-shaped container molded with a 20% by weight mixture of the xylylene group-containing polyamide resin could be reduced to ½ of that of a bottle-shaped container molded with only a single layer of PET.

A method of molding a bottle-shaped container with the above-described multilayer wall structure can be realized in a variety of processes. Generally, it is preferred that a preformed injection-molded piece of a bottomed cylindrical shape with wall structures having a first layer that will become the surface layers 1 and 2 and a second layer that will become the intermediate layer 3 is injection-molded by a sandwich molding method. The molded preformed piece is then blow-molded by biaxial orientation into a bottle-shaped container.

When the preformed piece is injection-molded by the sandwich molding method, the thickness of the intermediate layer 3 can be controlled and set by adjusting the viscosity of the resin material which forms the intermediate layer 3 and PET which form the surface layers 1 and 2.

It is advantageous for improving the moldability of the preformed piece to make the viscosity of the resin material which forms the intermediate layer 3 larger than that of the PET which forms the surface layers 1 and 2.

According to the present invention as described above, an bottle-shaped container has the surface layers 1 and 2, and the intermediate layer 3, the surface layers 1 and 2 are formed of PET, and the intermediate layer 3 is formed of the resin mixture material which is a mixture of the xylylene group-containing polyamide resin and PET. Therefore, since PET is contained in both the surfaces layers 1, 2 and the intermediate layer 3, the surface layers 1, 2 and the intermediate layer 3 can be integrally fusion-bonded, whereby exfoliation between the surface layers and the intermediate layer no longer occurs.

Since the molding temperatures of PET and the xylylene group-containing polyamide resin are quite similar, the bottle-shaped container with the surface layers and the intermediate layer can be easily molded.

Further, since PET and the xylylene group-containing polyamide resin forming the intermediate layer 3 are mixed, the physical properties of the xylylene group-containing polyamide resin are not varied, with the result that the intermediate layer 3 exhibits very high gas barrier properties due to the presence of the xylylene group-containing polyamide resin.

Figure 2:
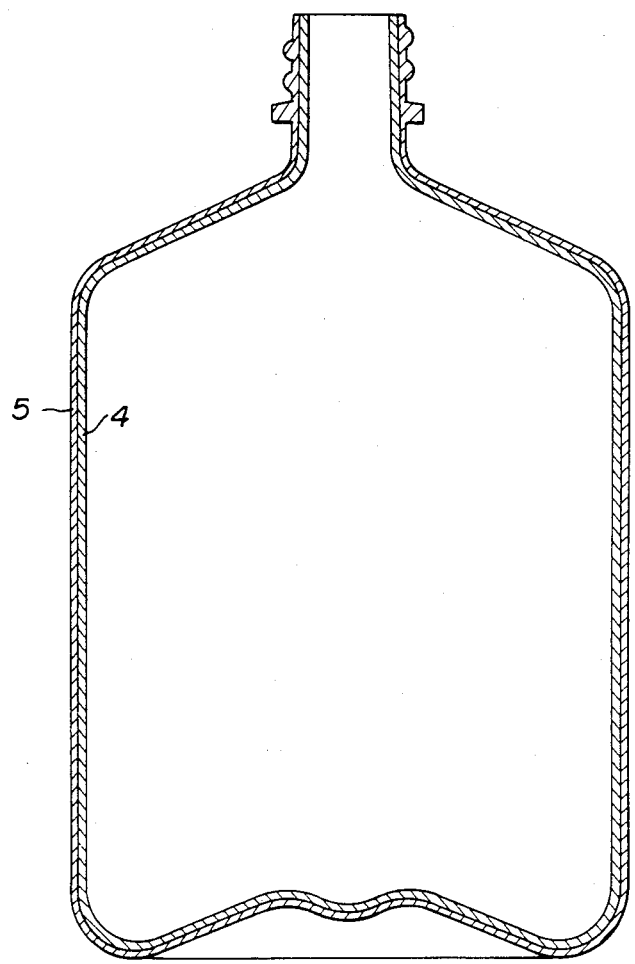
FIG. 2 is an elevational side view of a second preferred embodiment of the bottle-shaped container having a two-layer structure including an outer layer formed of a mixture of PET and a xylylene group-containing polyamide resin and an inner layer formed of PET.

FIG. 2 shows another preferred embodiment of the bottle-shaped container according to the present invention. This bottle-shaped container has a two-layer structure which contains an inner layer 4 formed of PET and an outer layer 5 formed of a resin mixture material which is a mixture of PET and the xylylene group-containing polyamide resin. The mixture ratio of the xylylene group-containing polyamide resin with the PET in the bottle-shaped container of this embodiment is in a range of 5 to 50% by weight of the xylylene group-containing polyamide resin to PET and is preferably the same as that of the embodiment exemplified in FIG. 1.

Figure 3:
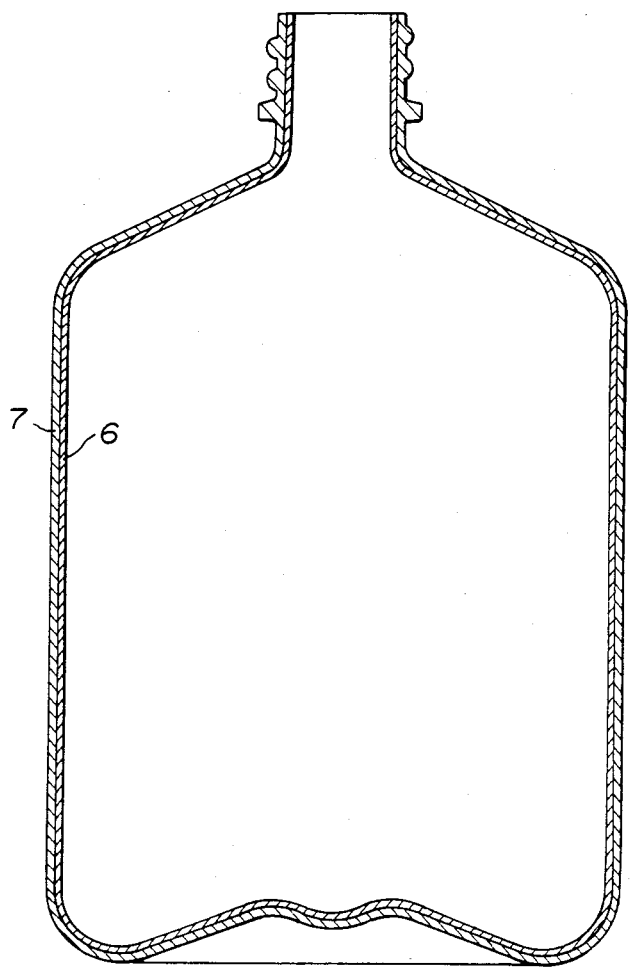
FIG. 3 is an elevational side view of a third preferred embodiment of the bottle-shaped container having a two-layer structure including an outer layer formed of PET and an inner layer formed of a mixture of PET and a xylylene group-containing polyamide resin.

FIG. 3 shows another preferred embodiment of the bottle-shaped container according to the present invention. This bottle-shaped container has an inner layer 6 formed of a resin mixture material which is a mixture of PET and the xylylene group-containing polyamide resin and an outer layer 7 formed of PET in a two layer structure, contrary to the relationship in FIG. 2.

As described above, the bottle-shaped container with the multilayer wall structure exhibits very high gas barrier properties and extremely high bonding strength between the surface layers and the intermediate layer. Therefore, the mechanical strength of the bottle-shaped container of the invention can be enhanced. Even if the layers of the bottle-shaped container employs different resin materials, the temperature of molding the bottle-shaped container can be simply controlled. Since the xylylene group-containing polyamide resin has relatively high transparency, a bottle-shaped container having a high degree of transparency can be provided.

What is claimed is:

1. A hollow blow-molded biaxially oriented bottle-shaped container comprising a mixture of a polyethylene terephthalate resin and a xylylene group-containing polyamide resin.

2. The hollow blow-molded biaxially oriented bottle-shaped container according to claim 1, wherein 5 to 30% by weight of said mixture is said xylylene group-containing polyamide resin.

3. A hollow blow-molded biaxially oriented bottle-shaped container comprising:
an inner surface layer and an outer surface layer, and an intermediate layer,
wherein said inner surface layer and said outer surface layer are formed of polyethylene terephthalate resin, and said intermediate layer is formed of a mixture of polyethylene terephthalate resin and a xylylene group-containing polyamide resin.

4. A hollow blow-molded biaxially oriented bottle-shaped container comprising:
a two-layer structure having an outer layer formed of a mixture of a polyethylene terephthalate resin and a xylylene group-containing polyamide resin, and an inner layer formed of a polyethylene terephthalate resin.

5. A hollow blow-molded biaxially oriented bottle-shaped container comprising:
a two-layer structure having an outer layer formed of a polyethylene terephthalate resin and an inner layer formed of a mixture of a polyethylene terephthalate resin and a xylylene group-containing polyamide resin.

6. The hollow blow-molded biaxially oriented bottle-shaped container according to claim 3, wherein 5 to 50% by weight of said mixture is said xylylene group-containing polyamide resin.

7. The hollow blow-molded biaxially oriented bottle-shaped container according to claim 4, wherein 5 to 50% by weight of said mixture is said xylylene group-containing polyamide resin.

8. The hollow blow-molded biaxially oriented bottle-shaped container according to claim 5, wherein 5 to 50% by weight of said mixture is said xylylene group-containing polyamide resin.

9. The hollow blow-molded biaxially oriented bottle-shaped container according to claim 3, wherein 10 to 30% by weight of said mixture is said xylylene group-containing polyamide resin.

10. The hollow blow-molded biaxially oriented bottle-shaped container according to claim 4, wherein 10 to 30% by weight of said mixture is said xylylene group-containing polyamide resin.

11. The hollow blow-molded biaxially oriented bottle-shaped container according to claim 5, wherein 10 to 30% by weight of said mixture is said xylylene group-containing polyamide resin.

12. The hollow blow-molded biaxially oriented bottle-shaped container according to claim 3, wherein 20% by weight of resin mixture is said xylylene group-containing polyamide resin.

13. The hollow blow-molded biaxially oriented bottle-shaped container according to claim 4, wherein 20% by weight of said mixture is said xylylene group-containing polyamide resin.

14. The hollow blow-molded biaxially oriented bottle-shaped container according to claim 5, wherein 20% by weight of said mixture is said xylylene group-containing polyamide resin.

* * * * *